United States Patent
Sawata et al.

(10) Patent No.: US 11,338,906 B2
(45) Date of Patent: May 24, 2022

(54) PROPELLER SYSTEM

(71) Applicant: Hamilton Sundstrand Corporation, Charlotte, NC (US)

(72) Inventors: Tadashi Sawata, Coventry (GB); Andrew Page, Tring (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 251 days.

(21) Appl. No.: 16/679,516

(22) Filed: Nov. 11, 2019

(65) Prior Publication Data
US 2020/0189720 A1 Jun. 18, 2020

(30) Foreign Application Priority Data
Dec. 13, 2018 (EP) .................................. 18212277

(51) Int. Cl.
B64C 11/32 (2006.01)
B64C 11/30 (2006.01)
B64C 11/44 (2006.01)
B63H 3/06 (2006.01)

(52) U.S. Cl.
CPC .............. B64C 11/32 (2013.01); B63H 3/06 (2013.01); B64C 11/305 (2013.01); B64C 11/44 (2013.01)

(58) Field of Classification Search
CPC ......... B64C 11/06; B64C 11/44; B64C 11/32; B64C 11/305; B63H 3/06; F04D 29/36; F04D 29/362; F04D 29/364
See application file for complete search history.

(56) References Cited

U.S. PATENT DOCUMENTS

| 4,648,345 A * | 3/1987 | Wham ..................... B63H 3/06 |
| | | 114/338 |
| 5,249,925 A | 10/1993 | Guimbal et al. |
| 5,249,992 A | 10/1993 | Schneider |
| 8,979,496 B2 * | 3/2015 | Eyraud .................... B64C 11/44 |
| | | 416/155 |
| 9,476,311 B2 * | 10/2016 | Krackhardt ............... F01D 7/00 |
| 2016/0083087 A1 | 3/2016 | Schank et al. |
| 2017/0074272 A1 | 3/2017 | Horng et al. |

FOREIGN PATENT DOCUMENTS

| BE | 464176 A | 3/1946 |
| CA | 891915 A | 2/1972 |
| DE | 444943 C | 5/1927 |
| FR | 3005096 A1 | 10/2014 |
| GB | 266829 A | 3/1927 |
| GB | 272578 A | 6/1927 |

OTHER PUBLICATIONS

Extended European Search Report for International Application No. 18212277.0 dated Jun. 24, 2016, 11 pages.
EPO Official Letter for Application No. 18212277.0, dated Feb. 2, 2022, 6 pages.

* cited by examiner

Primary Examiner — Richard A Edgar
(74) Attorney, Agent, or Firm — Cantor Colburn LLP

(57) ABSTRACT

A propeller system includes a rotatable housing having at least one propeller blade mounted thereon and an electric pitch control motor within the rotatable housing. A pitch control member is coupled to the propeller blade and extends through a wall of the rotatable housing. The pitch control motor is configured to move the pitch control member and to thereby vary the pitch of the propeller blade.

10 Claims, 2 Drawing Sheets

PROPELLER SYSTEM

FOREIGN PRIORITY

This application claims priority to European Patent Application No. 18212277.0 filed Dec. 13, 2018, the entire contents of which is incorporated herein by reference.

FIELD

The present disclosure relates to a motor and pitch control system for a propeller, and component parts thereof.

BACKGROUND

Propeller systems are known which have a motor for driving rotation of propeller blades and a pitch control system for adjusting the pitch of the propeller blades. In a typical electrical system, a motor drives a propeller rotor via a shaft, and the propeller blades are attached to the propeller rotor. The propeller rotor and motor have separate rotating components and require separate sets of bearings. The pitch control system is incorporated within the propeller rotor. These arrangement result in a mechanically complicated system having a relatively high weight and relatively low reliability and lifetime.

SUMMARY

The present disclosure provides a propeller system comprising: a rotatable housing having at least one propeller blade mounted thereon; an electric pitch control motor within the rotatable housing; and a pitch control member coupled to the propeller blade and extending through a wall of the rotatable housing; wherein the pitch control motor is configured to move the pitch control member and to thereby vary the pitch of the propeller blade.

This arrangement provides a relatively simple system for both rotating the propeller blades and also electrically controlling the pitch of the propeller blades.

The at least one blade is mounted on the radially outer surface of the rotatable housing.

The propeller blade extends radially outwards from the rotatable housing and may have an inner end mounted to the housing such that the propeller blade is able to rotate about its longitudinal axis. The pitch control member may be engaged with a lateral side of the propeller blade such that when the pitch control motor moves the pitch control member, the propeller blade is rotated about its longitudinal axis so as to vary the pitch of the propeller blade.

The pitch control motor may be a linear motor for moving the pitch control member in a direction that is substantially parallel to a rotational axis about which the rotatable housing rotates.

The pitch control member may extend from the propeller blade, through an elongated slot in the rotatable housing, and to an inner portion; wherein one or more magnet is arranged on the inner portion of the pitch control member.

The elongated slot may be a straight or curved slot extending substantially parallel to a rotational axis about which the rotatable housing rotates.

The propeller blade may be mounted to the rotatable housing such that it is rotatable about its longitudinal axis and may be coupled to the pitch control member so that movement of the pitch control member in a direction substantially parallel to the rotational axis rotates the blade about its longitudinal axis.

The propeller blade may be mounted on the rotatable housing at a location adjacent the slot.

The pitch control motor may comprise a winding for generating a magnetic field when supplied with an electric current, wherein said one or more magnet on the inner portion of the pitch control member comprises one or more permanent magnet.

The pitch control motor may comprise a stator on which the winding is arranged.

The propeller system may comprise a propulsion motor configured to rotate the rotatable housing, wherein the propulsion motor is an electric motor having an inner stator and an outer rotor. The rotatable housing may form part of the outer rotor.

As the rotatable housing forms part of the rotor, a propeller drive shaft is not required between the propulsion motor and the propeller rotor. As such, the arrangement is relatively simple, requires few bearings and requires less maintenance.

The propulsion motor may comprise a winding on the stator configured to generate a magnetic field when supplied with an electric current, and at least one permanent magnet on the rotor for being moved by the magnetic field.

The permanent magnets may be arranged on the radially inner side of the rotatable housing.

The rotatable housing may be mounted on one or more supports by bearings and the pitch control motor and propulsion motor may be axially located between the bearings.

The one or more supports may be a shaft and a stator of the pitch control motor and/or a stator of the propulsion motor may be located on the shaft.

The stator of the propulsion motor and a stator of the pitch control motor may be arranged within the rotatable housing.

The pitch control motor and the propulsion motor may be connected to a shared power supply.

The present disclosure also provides an aerospace or maritime vehicle having a propeller system as described herein. For example, the vehicle may be an aeroplane.

The present disclosure also provides a pitch control member for changing the pitch of a propeller blade, said pitch control member having a first end for connection to a propeller blade and a second end having one or more permanent magnets arranged thereon.

The present disclosure also provides an assembly for a propeller system comprising: a tubular housing having a slot extending through a wall thereof; and a pitch control member extending through the slot for varying the pitch of a propeller blade; wherein one or more permanent magnet is located on a radially inner portion of the pitch control member for use in moving the pitch control member with an electric motor.

The assembly may comprise at least one propeller blade mounted on a radially outer surface of the tubular housing.

The pitch control member may be coupled to the propeller blade.

The present disclosure also provides a method of installing the pitch control member described herein in the propeller system or assembly described herein. The method may comprise inserting the pitch control member through the wall of the housing and coupling an end of the pitch control member to a propeller blade.

The present disclosure also provides a propeller system comprising: an electric propulsion motor having an inner stator and an outer rotor; a rotatable housing forming part of the rotor; and at least one propeller blade mounted on the rotatable housing.

This propeller system may have any of the features described herein.

DETAILED DESCRIPTION

Figure 1A:
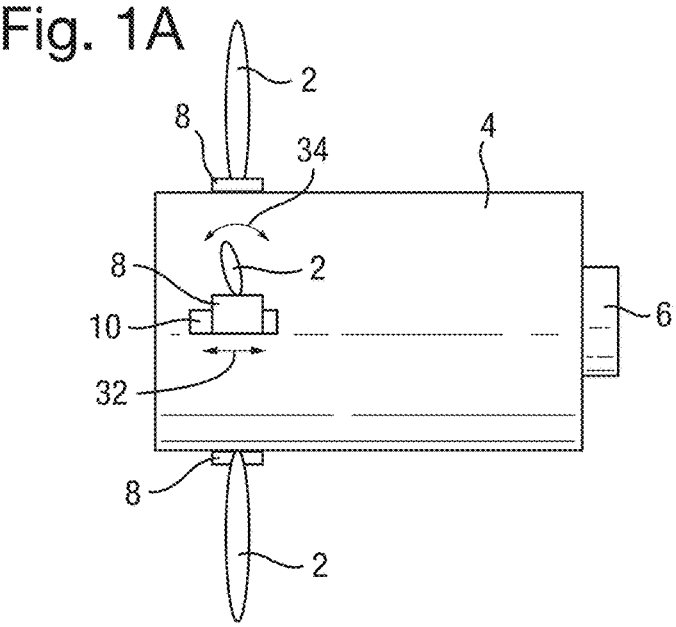
FIG. 1A shows a schematic side view of a propeller system according to an embodiment of the present disclosure.
Figure 1B:
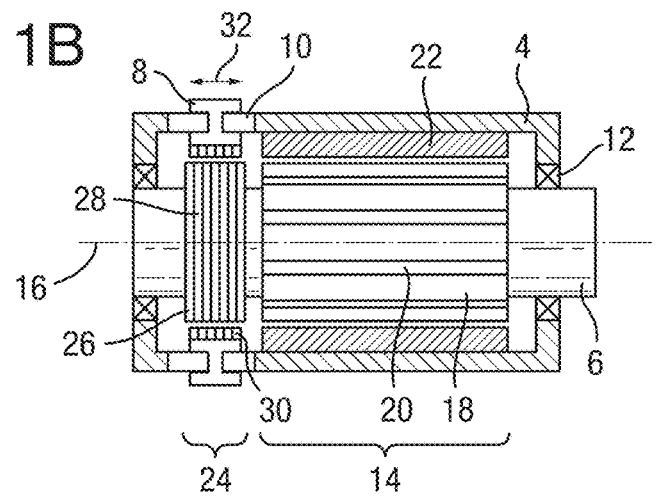
FIG. 1B shows a cross-sectional view through the system of FIG. 1A, with the propeller blades removed.
Figure 1C:
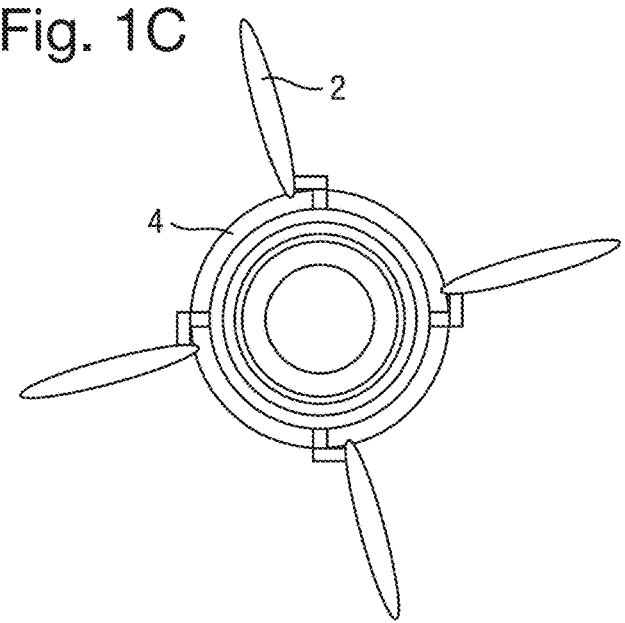
FIG. 1C shows a cross-sectional view of the propeller system of FIGS. 1A-1B, as viewed along the axis of rotation and at the location where the propeller blades are located.

A propeller system according to an embodiment of the present disclosure will now be described with reference to FIGS. 1A-1C. FIG. 1A shows a schematic side view of the propeller system. FIG. 1B shows a cross-sectional view through the system of FIG. 1A, with the propeller blades removed. FIG. 1C shows a cross-sectional view of the same propeller system, as viewed along the axis of rotation, at the location where the propeller blades are located.

Referring to FIG. 1A, the propeller system comprises propeller blades 2 mounted on a rotatable housing 4. Upper and lower propeller blades 2 are shown extending upwards and downwards from the rotatable housing 4. A third propeller blade is also shown, which extends in a direction out of the paper. A fourth propeller blade is also present on the opposite side of the housing 4 to the third blade (see FIG. 1C). Although four blades are shown in the depicted embodiment, other numbers of blades and blade configurations may be provided. The rotatable housing 4 is rotatably mounted on a support shaft 6 such that it can rotate thereon. Each propeller blade 2 is coupled to a pitch control member 8 that extends through a slot 10 through the housing wall. The pitch control member 8 is movable within the slot 10 for changing the pitch of the blade 2, as will be described in more detail below.

As shown in FIG. 1B, the rotatable housing 4 is rotatably mounted to the support shaft 6 at either longitudinal end via bearings 12. The system comprises an electric propulsion motor 14 for rotating the rotatable housing 4 about a rotation axis 16, and hence for rotating the propeller blades 2 about the rotation axis 16. The propulsion motor 14 comprises a stator 18, which may be mounted on the support shaft 6, and the rotatable housing 4 may form the rotor of the propulsion motor 14. In the depicted embodiment, the stator 18 comprising windings 20 and permanent magnets 22 are mounted on the inner side of the rotatable housing 4. The motor is configured to apply a time-varying electrical current to the windings 20 so as to generate a time varying-magnetic field that interacts with the magnetic field of the permanent magnets 22 that are mounted to the rotatable housing 4, thereby causing the permanent magnets 22 and rotatable housing 4 to rotate about the rotational axis 16. However, it is contemplated that the propulsion motor 14 may take other forms, provided that it rotates the rotatable housing 4. For example, the propulsion motor may be a wound-field or DC motor.

As described previously, each propeller blade 2 on the rotatable housing 4 is coupled to a pitch control member 8 that extends through a slot 10 in the housing 4. Although the blades 2 are not shown in FIG. 1B, two of the pitch control members 8 are shown on opposite sides of the rotatable housing 4. Each pitch control member 8 has a radially outer portion that engages its respective propeller blade 2 (e.g. outside of the housing near the base of the blade), a central portion that is arranged within the slot 10, and a radially inner portion arranged within the rotatable housing 4. The propeller system comprises an electric pitch control motor 24 for moving the pitch control members 8 back and forth within their respective slots 10, substantially parallel to the axis of rotation 16. The pitch control motor 24 may be a linear motor and may comprise a stator 26 mounted on the support shaft 6. In the depicted embodiment, the stator 26 comprises windings 28 and permanent magnets 30 are mounted on the inner portion of each pitch control member 8. The pitch control motor 24 is configured such that when a first electric current is supplied to the windings 28 this generates a magnetic field that interacts with the magnetic field of the permanent magnets 30 that are mounted to the inner portion of each pitch control member 8, thereby causing the permanent magnets 30 to move in a first direction substantially along the axis of rotation 16. This causes each pitch control member 8 to move within its respective slot 10 in the rotatable housing 4 and in the direction substantially along the axis of rotation 16. The pitch control motor 24 may also be configured such that when a second (e.g. opposite) electric current is supplied to the windings 28 this generates a magnetic field that interacts with the magnetic field of the permanent magnets 30 that are mounted to the inner portion of each pitch control member 8, thereby causing the permanent magnets 30 to move in a second direction substantially along the axis of rotation 16. This causes each pitch control member 8 to move within its respective slot 10 in the rotatable housing 4 and in the second direction substantially parallel to the axis of rotation 16.

The operation of the propeller system will now be described. When it is desired to rotate the propeller blades 2, a time-varying electrical current is applied to the windings 20 on the stator 18 of the propulsion motor 14. This generates a time varying-magnetic field that interacts with the magnetic fields of the permanent magnets 22 that are mounted to the rotatable housing 4. This applies a force on the permanent magnets 22 and causes the magnets, and the rotatable housing 4 coupled thereto, to rotate about the stator 18. As the propeller blades 2 are mounted on the rotatable housing 4, they are also caused to rotate. The pitch angle of each propeller blade 2 may be locked until it is desired to change the pitch of the blades.

As described above, it may be desired to change the pitch of the propeller blades 2, e.g. prior to or during flight of an aircraft having the propeller system. As shown in FIG. 1C, each propeller blade 2 is elongated in a radial direction extending outwardly from the rotatable housing 4. As the skilled person will appreciate, changing the pitch of a blade in this context refers to rotating the blade 2 about its longitudinal axis. This changes the angle of the leading edge of the blade 2 with respect to the direction of rotation of the rotatable housing 4, thereby changing the level of thrust induced by the propeller blade 2.

When it is desired to change the pitch of the propeller blades 2, a first electric current is supplied to the windings 28 of the pitch control motor 24. This generates a magnetic field that interacts with the magnetic field of the permanent magnets 30 that are mounted to the inner portion of each pitch control member 8, thereby causing the permanent magnets 30 and each pitch control member 8 to move in a first direction within its respective slot 10 in the rotatable housing 4 (i.e. parallel to the axis of rotation 16 of the propeller). This is depicted by arrow 32 in FIGS. 1A and 1B. As best shown in FIG. 1C, each propeller blade 2 may be engaged with the rotatable housing at its radially inner end and in a manner that allows it to rotate about its own longitudinal axis. As best shown in FIGS. 1A and 1C, a lateral side of each blade 2 may be engaged with its respective pitch control member 8. As such, when the pitch control member 8 is moved in the first direction by the pitch control motor 24 it causes the propeller blade 2 to rotate about its longitudinal axis and change pitch. This is shown by arrows 34 in FIG. 1A (in relation to the blade extending out of the paper). There may therefore be a cam coupling between the pitch control member 8 and the propeller blade 2 so as to cause a cam action when the pitch control member 8 is moved relative to the propeller blade 2.

Similarly, when it is desired to change the pitch of the propeller blade 2 in a second direction, a second electric current may be supplied to the windings 28 of the pitch control motor 24 (e.g. in the opposite direction to the first current). This generates a magnetic field that interacts with the magnetic field of the permanent magnets 30 that are mounted to the inner portion of each pitch control member 8, so as to cause the permanent magnets 30 and each pitch control member 8 to move in a second direction within its respective slot 10 in the rotatable housing 4 (i.e. along the axis of rotation of the propeller). As such, when the pitch control member 8 is moved in the second direction by the pitch control motor 24 it causes the propeller blade 2 to rotate about its longitudinal axis and change pitch.

The slots 10 may have lengths that are sized to restrict the movement of the pitch control members 8 between predetermined limits in the axial direction (and may have widths to prevent any orthogonal movement in the circumferential direction, or may be shaped to allow specific orthogonal movement).

The elongated slots 10 may be straight. Alternatively, each slot may be curved and each pitch control member 8 coupled to its respective propeller blade 2 such that as the pitch control member 8 is moved along the curved slot it rotates the blade 2 about its longitudinal axis so as to change its pitch. In these embodiments the pitch control member 8 may be fixedly connected to its respective blade 2 (e.g. not pivotably connected).

Each propeller blade 2 may be biased towards a predetermined pitch angle.

The pitch control motor 24 and propulsion motor 14 may be axially adjacent.

The pitch control motor 24 and/or propulsion motor 14 may have a tubular stator.

The motors 14,24 described herein may be brushless electric motors. These arrangements may completely obviate the need for electrical connections between rotating and stationary components of the propeller system. The only physical coupling between the components on the rotatable housing 4 and those on the support 6 may be via the bearings 12 upon which the rotatable housing 4 is mounted.

Figure 2:
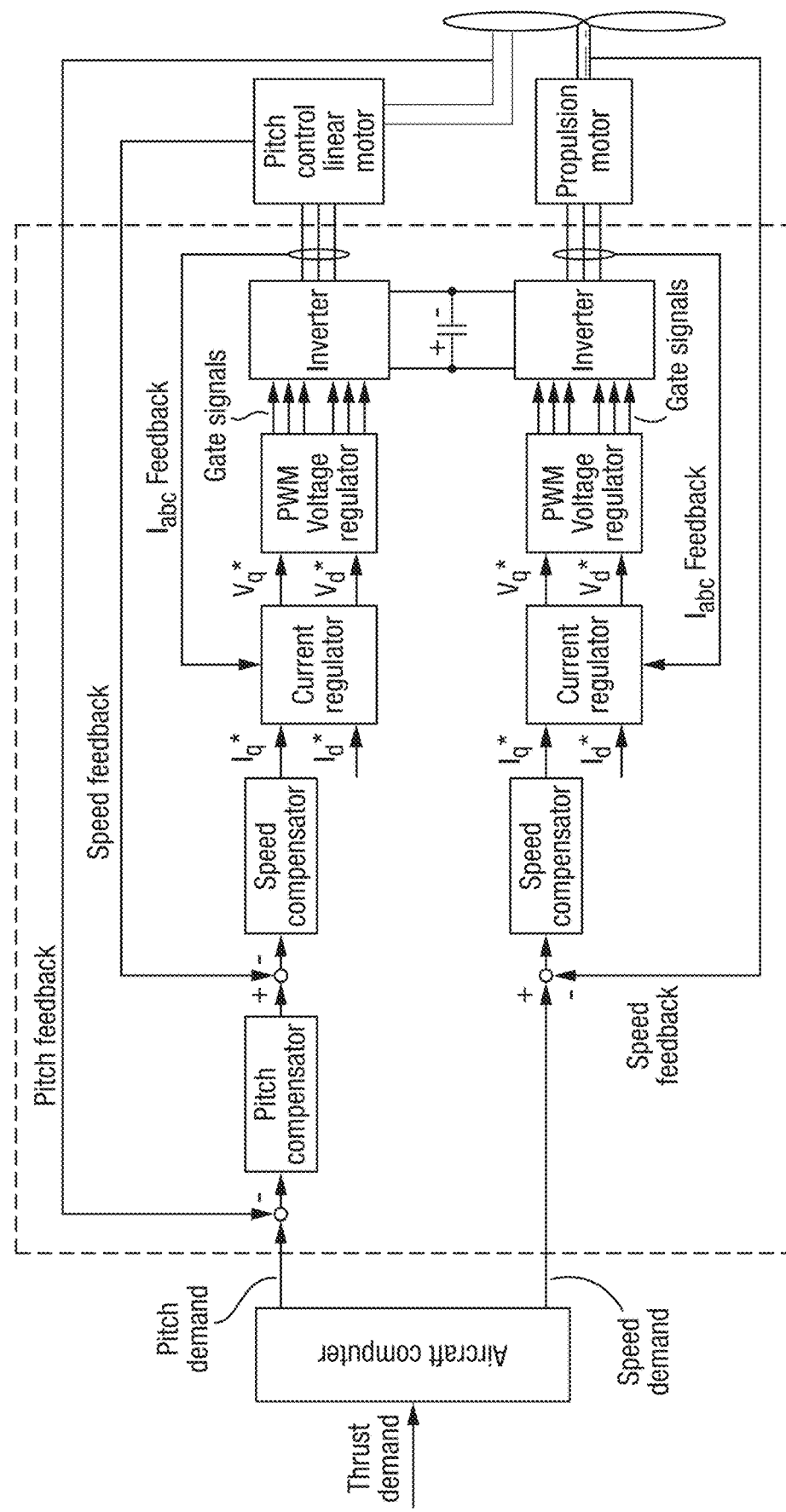
FIG. 2 shows an example of control logic for controlling the propeller system.

FIG. 2 shows an example of control logic for the propeller system. A thrust demand input may be converted, via an aircraft computer, into a pitch demand and/or speed (i.e. RPM) demand signal. The pitch demand signal may then control the pitch control motor so as to vary the pitch angle of the propeller blades and/or the speed demand signal may then control the propulsion motor so as to vary the rotational speed of the rotatable housing. For example, if a demand for more thrust (or less thrust) is transmitted to the aircraft computer, the control logic may determine that an increase (or decrease) in blade pitch is appropriate and may control the current transmitted to an inverter of the linear motor so as to axially move the pitch control members in a direction that increases (or decreases) the pitch of the blades. If a demand for more thrust (or less thrust) is transmitted to the aircraft computer, the control logic may determine that an increase (or decrease) in blade speed is appropriate and may control the current transmitted to an inverter of the propulsion motor so as to increase (or decrease) the speed of rotation of the rotatable housing. The control logic may command a combined change in blade pitch and motor speed.

The control logic may control motor speed to be constant as blade pitch changes, e.g. increasing pitch may increase the torque demand and without a change to motor inputs the motor would slow down.

The control logic may comprise a pitch compensator circuit that provides feedback of the actual pitch of the blades. Additionally, or alternatively, the control logic may comprise a speed compensator circuit that provides feedback of the actual speed of rotation of the rotatable housing or blades. Additionally, or alternatively, the control logic may comprise one or more current regulator circuits that provides feedback of the current supplied to the pitch control motor and/or propulsion motor. These feedbacks may be used to control the operation of the pitch control motor and/or propulsion motor.

It will be appreciated that the control logic allows advanced and combined control of the propeller speed and pitch with high response frequency, which may improve aircraft dynamics and efficiency.

The linear motor 24 and the propulsion motor 14 may share an electrical power supply (e.g. an AC power supply) and/or a DC link bus. Alternatively, the linear motor and the propulsion motors may have individual power supplies.

Although the present disclosure has been described with reference to various embodiments, it will be understood by those skilled in the art that various changes in form and detail may be made without departing from the scope of the invention as set forth in the accompanying claims.

For example, the propeller system described herein may be used in applications other than for aircrafts.

The invention claimed is:

1. A propeller system comprising:
   a rotatable housing having at least one propeller blade mounted thereon;
   an electric pitch control motor within the rotatable housing; and
   a pitch control member coupled to the propeller blade and extending through a wall of the rotatable housing;
   wherein the pitch control motor is configured to move the pitch control member and to thereby vary the pitch of the propeller blade;
   wherein:
   the propeller blade extends radially outwards from the rotatable housing and has an inner end mounted to the housing such that the propeller blade is able to rotate about its longitudinal axis; and
   the pitch control member is engaged with a lateral side of the propeller blade such that when the pitch control motor moves the pitch control member, the propeller blade is rotated about its longitudinal axis so as to vary the pitch of the propeller blade.

2. The propeller system of claim 1, wherein the pitch control member extends from the propeller blade, through an elongated slot in the rotatable housing, and to an inner portion; wherein one or more magnet is arranged on the inner portion of the pitch control member.

3. The propeller system of claim 2, wherein the elongated slot is a straight or curved slot extending substantially parallel to a rotational axis about which the rotatable housing rotates.

4. The propeller system of claim 2, wherein the pitch control motor comprises a winding for generating a magnetic field when supplied with an electric current, and wherein said one or more magnet on the inner portion of the pitch control member comprises one or more permanent magnet.

5. A propeller system comprising:
a rotatable housing having at least one propeller blade mounted thereon;
an electric pitch control motor within the rotatable housing; and
a pitch control member coupled to the propeller blade and extending through a wall of the rotatable housing;
wherein the pitch control motor is configured to move the pitch control member and to thereby vary the pitch of the propeller blade;
wherein the pitch control motor is a linear motor for moving the pitch control member in a direction that is substantially parallel to a rotational axis about which the rotatable housing rotates.

6. A propeller system comprising:
a rotatable housing having at least one propeller blade mounted thereon;
an electric pitch control motor within the rotatable housing;
a pitch control member coupled to the propeller blade and extending through a wall of the rotatable housing, wherein the pitch control motor is configured to move the pitch control member and to thereby vary the pitch of the propeller blade; and
a propulsion motor configured to rotate the rotatable housing, wherein the propulsion motor is an electric motor having an inner stator and an outer rotor, and wherein the rotatable housing forms part of the outer rotor.

7. The propeller system of claim 6, wherein the propulsion motor comprises a winding on the stator configured to generate a magnetic field when supplied with an electric current, and at least one permanent magnet on the rotor for being moved by the magnetic field.

8. The propeller system of claim 6, wherein the rotatable housing is mounted on one or more supports by bearings and the pitch control motor and propulsion motor are axially located between the bearings.

9. The propeller system of claim 8, wherein the one or more supports is a shaft and a stator of the pitch control motor and/or a stator of the propulsion motor are located on the shaft.

10. The propeller system of claim 8, in combination with an aerospace vehicle or a maritime vehicle.

* * * * *